United States Patent Office 2,856,389
Patented Oct. 14, 1958

2,856,389

PETROLEUM RESINS CONTAINING INDENE

James V. Fusco, Roselle Park, and Stanley B. Mirviss, Roselle, N. J., assignors to Esso Research and Engineering Company, a corporation of Delaware No Drawing. Application July 22, 1953
Serial No. 369,703

6 Claims. (Cl. 260—82)

This invention relates to a novel process for improving the quality of petroleum hydrocarbon resins and, more particularly, to a process in which petroleum resins are improved by the addition to the feed streams of limited amounts of indene and indene containing streams.

Hydrocarbon resins can be produced from certain unsaturated petroleum refinery streams containing mixtures of olefins and diolefins by such methods as polymerization using Friedel-Crafts catalysts. The steam cracked distillates have been found especially useful for this purpose.

Such distillates are prepared by cracking petroleum fractions as kerosene, gas oil, naphtha or residua in the presence of 50 to 90 mole percent stream at temperatures of about 1000° F. to 1600° F. The liquid cut boiling largely below $C_9$ is segregated and is preferably heated at about 90 to 140° C. to dimerize cyclopentadienes. After the dimerization, a $C_8$ to $C_9$ and lighter liquid cut including $C_5$ is taken overhead and there is separated a dimer concentrate as bottoms. This overhead stream may, if desired, be topped to about 38° C. to remove the isoprene containing fraction. The stream obtained boiling from 20 to about 170° C., or selected portions thereof, is used as the basic polymerization feed.

It has now been found, however, that if a quantity of indene or an indene concentrate is added to the feed streams and the polymerization is carried out on the resulting blends, improved resins of higher softening points are obtained. The resins obtained have substantially higher softening points than are realized when the indene is not present in the reaction mixture. The resin products contain no insoluble gel. The indene containing fraction which is added should contain at least 10% indene and can be any higher concentration up to 100% indene.

The total resin feed consists of blends of from 95 to 50 parts of a steam cracked distillate boiling in the range of 20 to 170° C., or fractions thereof, and 5 to 50 parts of an aromatic fraction containing 10–100% indene and/or methylated indenes. The amount of the aromatic fraction used must be adjusted so as to give: (1) a polymerization feed containing 5 to 20% indenes and (2) less than 25% of liquid polymer under the stripping conditions specified.

For increasing the resin yield it is preferable that a minimum of 5% indene be used. The increased yield of resin and the resin softening point are dependent on the amount of indene used. Based on equivalent resin softening points of 90° C., the net increase in resin yield amounts to at least 120 to 130% of the amount of indene used. Although it is not intended to limit the good results of this invention to any theory, it seems that the indene copolymerizes with some of the less reactive components of the feed. This behavior seems to be in part due to the cyclic nature of the olefinic portion of the molecule besides the presence of the aromatic ring in the molecule. This effect can be ascertained by comparison with styrene, a similar molecule except for the ring nature of the olefinic portion of the molecule. Under similar conditions, styrene produces increases in resin yield but never more than that corresponding to the amount of styrene added. In addition, styrene causes a decrease in resin softening point.

In addition to the above advantages of this invention, the presence of the indene causes a decrease in the unsaturation of the resin. For many uses of petroleum resins, low resin unsaturation is very advantageous.

Hydrocarbon resin processes to which the present invention is applicable are carried out by treating a hydrocarbon mixture containing diolefins, olefins, aromatics, paraffins, and naphthenes with about 0.25 to 3.0%, based on the unsaturated hydrocarbon feed, of an aluminum halide catalyst such as aluminum chloride and aluminum bromide. The catalysts may be used as solids or they may be employed as solutions, slurries or complexes. Hydrocarbon complexes of the catalysts, obtained by reaction of the aluminum halide with a resin raffinate containing about 60% olefins and 40% aromatics, are also quite useful.

Typical hydrocarbon fractions useful for feeds in making these resins, boil from 20° to 170° C. Analyses show the following composition.

Distillation range:

| Wt. percent— | Fraction, °C. |
|---|---|
| 0–60 | 20– 70 |
| 65–40 | 70–130 |
| 35–0 | 130–170 |

| Composition: | Wt. percent |
|---|---|
| Diolefins | 10–25 |
| Aromatics | 20–50 |
| Olefins | 66–24 |
| Paraffins | 4– 1 |

The polymerization reactions are conducted at temperatures in the range of −30 to +85° C., and preferably from −15° to +70° C. Generally, the amount of indene containing material added should be restricted to correspond or be equivalent to from 5% up to not more than 20% of indene based on the total feed mixture. Subject to this limitation, the indene may be used as a concentrate of 10% or higher purity.

In carrying out the polymerizations, either batch or continuous operations may be employed. The reaction is carried out in one or more stages within a period of 0.25 to 1.5 hours. The resin formed may be recovered by water and/or alkali washing to remove catalyst followed by stripping off the unpolymerized material. One good way to remove the halide catalyst is to add methyl alcohol to form a solid complex, which is then filtered off. The resin stripping is carried to 260° C. still bottoms temperature at atmospheric pressure. To recover the liquid polymer ($C_{10+}$ polymer), the temperature is dropped and stripping is continued with superheated steam or at 3–5 mm. Hg pressure to a maximum bottoms temperature of 260–270° C.

The invention is described in more complete detail by the following examples although it is not intended to limit the scope of the invention thereto.

A series of steam-cracked naphtha feed streams was employed as basic feeds in these experiments. These naphthas are identified as naphthas A, B and C and their boiling ranges and compositions are as follows:

Naphtha A:
 Boiling range—30–135° C.
 About 18% diolefins
   25% aromatics
   54% olefins
   3% paraffins Naphtha B:
 Boiling range—about 35–125° C.
 About 22.6 wt. percent diolefins
   48.0 wt. percent olefins
   27.4 wt. percent aromatics
   2.0 wt. percent paraffins and naphthenes Naphtha C:
 Boiling range—about 20–170° C.
 About 11.6% diolefins
   38.2% olefins
   48.2% aromatics
   2.0% paraffins

EXAMPLE 1

A representative steam cracked distillate boiling in the approximate range of 30 to 135° C. and having the composition as defined for Naphtha A above, was polymerized alone and in combination with varying amounts of indene concentrate containing 90% indene. The results of these batch polymerizations under several conditions of operation are presented in Table I.

To carry out the polymerizations, the blended olefinic feed is contacted with catalyst at a temperature of 20–25° C. The catalyst is added over about a ½ hour period. After completion of catalyst addition, the reaction mixture is agitated at this temperature for an additional ½ hour. The product is then quenched with a 10 vol. percent of 5% (aqueous) $H_2SO_4$, and stirred an additional 30 minutes at 50° C. to remove the catalyst. After separation of layers, the polymerizate was again washed with water. The polymerizate was then stripped to an end point of 270° C. bottoms temperature at 3–6 mm. Hg. For instance, using 10% indene, the resin or bottoms amounted to 36.8% of the initial feed mixture and had a 100° C. softening point and 167 ASTM iodine number. The fill amounted to 5.5 wt. percent of the feed. On a 90° C. softening point basis, and by comparison with resin product from Naphtha A alone, this means an increase in resin yield of 123% based on the amount of indene added.

These data show substantial improvements in resin yields and softening points effected by incorporation of indene into feed. The net increase in yield at a given softening point represents 120–130% on the indene in the feed. It is also desirable that reductions in unsaturation (iodine number) are obtained.

*Table I*

EFFECT OF INDENE ON RESIN YIELD AND SOFTENING POINT BOILING RANGES, APPROX. COMPOSITION

| Comp. of feed, weight percent | | Weight percent on feed | | Weight percent yield | | Resin properties | | |
|---|---|---|---|---|---|---|---|---|
| Naphtha A | 90% indene concentrate | Indene | $AlCl_3$ catalyst | Resin | Liquid polymer | Soft. pt., °C.[1] | Iodine No.[2] | Color[3] |
| 100 | ----- | 0 | 1.0 | 31.4 | 3.4 | 90 | 192 | 3 |
| 100 | ----- | 0 | 2.0 | 32.9 | 6.4 | 90 | 192 | 5 |
| 94.45 | 5.55 | 5 | 1.0 | 35.1 | 5.3 | 92 | 190 | 4 |
| 94.45 | 5.55 | 5 | 2.0 | 36.0 | 6.8 | 94 | 178 | 5 |
| 88.9 | 11.1 | 10 | 1.0 | 36.8 | 5.5 | 100 | 167 | 4 |

[1] ASTM E-28-51-T.
[2] ASTM D-555-47.
[3] Gardner color of a solution of 1 gm. resin/67 ml. xylene.

EXAMPLE 2

In a second series of experiments Naphtha B was used as the basic fraction in resin feed blends with varying amounts of 90% indene concentrate. Higher yields of high softening point resins were obtained with small amounts of liquid polymer or "fill" material. Variations in reaction temperature from −10° C. to +60° C. gave uniformly good results. The results using either $AlCl_3$ or $AlBr_3$ were found to be good.

*Table II*

EFFECT OF INDENE ON YIELD AND SOFTENING POINT WITH DIFFERENT CATALYSTS AND TEMPERATURES

| Comp. of feed, weight percent | | Weight percent on feed | | Reaction temp., °C. | Weight percent yield | | Resin properties | | |
|---|---|---|---|---|---|---|---|---|---|
| Naphtha B | 90% indene concentrate | Indene | Catalyst | | Resin | Liquid Polymer | Soft. pt., °C. | Iodine No. | Color |
| 100 | ------ | 0 | 1.0 $AlCl_3$ | 20 | 34.3 | 4.0 | 90 | 214 | 3 |
| 80 | 20 | 18 | 1.0 $AlCl_3$ | 20 | 45.3 | 4.0 | 127 | 153 | 4 |
| 90 | 10 | 9 | 3.0 $AlCl_3$ | −10 | 40.1 | 2.8 | 107 | 182 | 4 |
| 90 | 10 | 9 | 1.0 $AlBr_3$ | 60 | 38.8 | 6.2 | 105.5 | 182 | 6 |
| 90 | 10 | 9 | 0.5 $AlCl_3$ | 20 | 36.8 | 5.0 | 106 | 195 | 2.5 |

EXAMPLE 3

A further series of experiments was carried out to show the effect of polymerizing blends of Naphtha B with more dilute indene containing fractions (11.6 wt. percent to 50 wt. percent indenes). The results are shown in Table III below.

These data show that aromatic fractions containing indenes and boiling in the range of 170 to 230° C. can be used to obtain improved resin yields and softening points providing that the indene concentration is 5–20% on the feed. It will be understood that a fraction boiling in this range will contain methylated indenes as well as indene. Under the stripping conditions employed a liquid polymer is produced which, for practical considerations, that is, distillation, handling and the like, should not be greater than 25% based on the feed. For this reason, no more than about 50% of the feed can be an indene fraction of 10% indenes content. It is preferable that relatively smaller amounts of aromatic indene cuts of greater than 10% purity be used to avoid production of excessive amounts of liquid polymer. Another practical consideration is that it is necessary to use as much of the mixed basic fraction as possible and at the same time, as little of the indene fraction as possible.

Table III
USE OF DILUTE INDENE FRACTIONS IN RESIN FEEDS

| Comp. of feed, weight percent | | Weight percent on feed | | Weight percent yield | | Resin properties | |
|---|---|---|---|---|---|---|---|
| Naptha B | Aromatic (indene) fraction [1] | Indenes | AlCl₃ | Resin | Liquid polymer | Soft pt., °C. | Color |
| 100 | ---- | 0 | 1.0 | 34.3 | 4.0 | 90 | 3 |
| 80 | 20 of a | 3.8 | 1.0 | 35.8 | 12.7 | 89 | 3.5 |
| 50 | 50 of b | 5.8 | 1.0 | 35.8 | 22.1 | 106 | 3 |
| 50 | 50 of a | 9.5 | 1.0 | 41.2 | 17.3 | 111 | 3.5 |
| 80 | 20 of c | 10 | 1.0 | 39.4 | 9.6 | 105 | 3.0 |
| 60 | 40 of c | 20 | 1.0 | 45.3 | 16.2 | 124 | 3.5 |

[1] Aromatic indene fraction a contains 19% indenes, b contains 11.6% indenes, and c contains 50% indenes. All indene fractions have boiling range 170–230° C.

EXAMPLE 4

In another series of runs a steam cracked distillate, defined above as Naphtha C, was employed. The resulting data, summarized in Table IV, illustrate the advantages of using indene in conjunction with this naphtha, and shows that the exact composition of the basic naphtha fraction is not critical.

Table IV
EFFECT OF INDENE ON RESIN QUALITY

| Comp. of feed, weight percent | | Weight percent on feed | | Weight percent yield resin | Resin properties | |
|---|---|---|---|---|---|---|
| Naphtha C | 90% indene concentrate | Indene | AlCl₃ | | Soft pt., °C. | Color |
| 100 | ---- | 0 | 1.0 | 22.0 | 68 | 5 |
| 90 | 10 | 9 | 1.0 | 28.4 | 94.5 | 4 |

What is claimed is:

1. In a process for preparing improved solid petroleum resins which comprises polymerizing a steam-cracked petroleum fraction boiling in the range of 20° to 170° C. over a Friedel-Crafts metal halide catalyst, the improvement which comprises adding a reactive hydrocarbon fraction consisting essentially of indenes to said petroleum fraction prior to the polymerization reaction such that at least 5 wt. percent of indenes, based on the total feed mixture, are present.

2. In a process for preparing improved solid petroleum resins which comprises polymerizing a steam-cracked petroleum resin, which has been cracked at a temperature between about 1000° and 1600° F. to give a distillate boiling in the range of 20° to 170° C., over a Friedel-Crafts metallic-halide catalyst at a temperature between about −30° and +85° C., separating the catalyst from the resulting resin-containing hydrocarbon mixture, washing said mixture with water and then alkali, stripping the hydrocarbon mixture to a maximum temperature of about 270° C., and recovering the liquid polymer overhead and the solid resin as bottoms, the improvement which comprises adding a reactive hydrocarbon fraction consisting essentially of indenes to said steam-cracked petroleum fraction prior to the polymerization reaction such that 5 to 20 wt. percent of indenes, based on the total feed mixture, are present.

3. A process for preparing improved solid petroleum resins which comprises passing a feed mixture consisting essentially of steam-cracked naphtha, having a boiling range of about 30° to 135° C., and 5 to 20 wt. percent of pure indenes, based on the total feed mixture, over an aluminum halide catalyst at a temperature of about −15° to +70° C. for a time sufficient to form a resin-containing reaction mixture, separating said catalyst from a resin-containing hydrocarbon solution, washing said solution with water and then alkali, passing said solution to a stripping zone, stripping the liquid polymer co-product overhead at temperatures up to about 270° C., and recovering the solid resin co-product as bottoms.

4. A process for preparing improved solid petroleum resins which comprises mixing a steam-cracked naphtha, having a boiling range of about 38° to 120° C. and consisting essentially of 10–25 wt. percent diolefins, 24–66 wt. percent olefins, 5–50 wt. percent aromatic hydrocarbons, and 1–4 wt. percent paraffins, with a pure indenes stream such that 5 to 20 wt. percent indenes, based on the total resulting feed mixture, are present, contacting said feed mixture with an aluminum chloride catalyst at a temperature between about 0° and 50° C. for about 0.25 to 1.5 hours, separating said catalyst from the resulting resin-containing hydrocarbon solution, washing said solution with water and then alkali, passing the washed solution to a stripping zone, stripping the liquid polymer overhead at temperatures up to about 270° C., and recovering the solid resin product as bottoms.

5. An improved solid petroleum resin produced by the process which comprises polymerizing a feed mixture comprising a steam-cracked naphtha boiling in the range of 20° to 170° C. and a reactive aromatic fraction consisting essentially of indenes, such that 5 to 20 wt. percent indenes are present based on the total feed mixture, with a Friedel-Crafts metal halide catalyst, separating said catalyst from the resulting resin-containing hydrocarbon solution, stripping liquid polymer from said solution, and recovering the solid resin.

6. The improved solid petroleum resin produced by the process as described in claim 4.

References Cited in the file of this patent

UNITED STATES PATENTS

| | | |
|---|---|---|
| 1,263,813 | Sperr | Apr. 23, 1918 |
| 2,193,792 | Wilson | Mar. 19, 1940 |